BURST ERROR DETECTOR

Filed May 28, 1965 3 Sheets-Sheet 1

INVENTORS
JOSEPH C. KENNEDY
JOHN H. SORG, JR
BY W. G. Robertson
ATTORNEY

Sept. 2, 1969 J. C. KENNEDY ET AL 3,465,287

BURST ERROR DETECTOR

Filed May 28, 1965 3 Sheets-Sheet 3

United States Patent Office 3,465,287

Patented Sept. 2, 1969

3,465,287

BURST ERROR DETECTOR

Joseph C. Kennedy and John H. Sorg, Jr., Poughkeepsie, N.Y., assignors to International Business Machines Corporation, Armonk, N.Y., a corporation of New York Filed May 28, 1965, Ser. No. 459,854

Int. Cl. G08b *29/00;* G06f *11/00*

U.S. Cl. 340—146.1 14 Claims

ABSTRACT OF THE DISCLOSURE

A shift register with feedback through modulo 2 adders for encoding or decoding binary data according to a generator polynomial for error detection is disclosed in an improved form for transmitting code bits from an encoder to a decoder and for parallel transmission of data.

Figure 1:
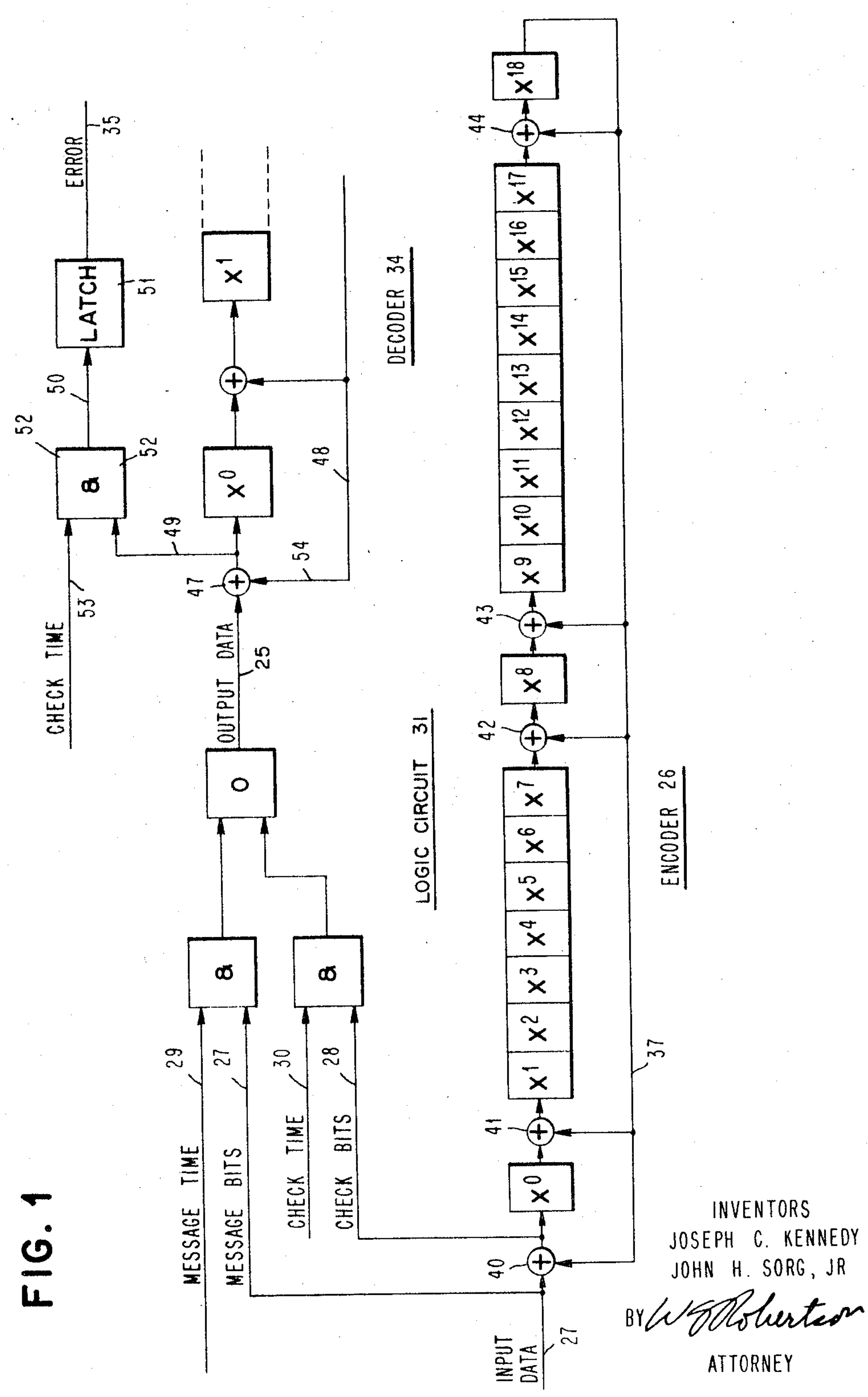

*Introduction to error detection and correction.*—Messages are often made up of a pattern of individual signals called bits that can be given either of two values, for example, two distinguishable voltage levels. The two values are called 1 and 0 because they can be manipulated according to rules of algebra that will be described later. The circuits that form the bits into a message and transmit the message sometimes fail and thereby cause a bit or several bits to be received with a value opposite to the intended value. Without a system of error detection, the error message would be interpreted simply as a different but valid message. The general aim of an error detecting system is to make an error message easily distinguishable from a valid message. This is done by transmitting check bits with the message bits. A circuit called an encoder receives the message at the sending station and generates the check bits. At the receiving station a decoder operates on the message bits to generate a second group of check bits. Encoding and decoding circuits are often similar in structure and in operation and are called simply coding circuits when their common features are referred to. If there has been no error, the check bits generated by the decoder will agree wtih the check bits transmitted by the encoder. Comparison circuits receive the incoming check bits and the decoder check bits and produce an error signal if the two sets of check bits do not agree. Other circuits may be provided to analyze the check bits to identify which bit position contains the error.

The effect of adding check bits to message bits is to multiply the number of possible messages thaat can be formed. For example, the 19 check bit error detector that will be described later establishes $2^{19}$ (something over a half million (possible new messages for each message that could be made up with the original number of message bits. Only the original number of combinations is used for valid messages. The rest of the combinations represent error messages. Encoding systems are arranged so that certain kinds of errors always give a pattern of message and check bits that will be recognized as an error. The valid messages can be thought of as being separated from each other by the recognizable error patterns. Generally a high portion of the more elusive errors can also be detected.

The error detector that will be described in detail later is of a type called a burst error detector because it is particularly arranged to detect errors that may be caused at several nearby bit positions from a noise burst. It is helpful in understanding the burst error detector to consider the message as a polynomial ($M_0X^0+M_1X$ . . . $M_nX^n$) where M is a coefficient of a term of the polynomial corresponding to the 1 or 0 that actually makes up the message. The message polynomial is divided by a generator polynomial. Thus, for each different message there is a unique combination of a quotient plus a remainder. The remainder by itself carries enough error detection information that it alone is transmitted as the check bits and the quotient is not used. As can be seen by analogy to decimal division, the remainder varies cyclically over the range of message polynomials. For this reason these error correcting codes are called cyclic codes. Because of this cyclic property, messages with the same check bit pattern are kept numerically remote from each other. There are well known rules for selecting the generator polynomial to give particular detecting and correcting properties; that is, to arrange that any particular message can be transformed into a different valid message with the same check bit sequence only by a succession of errors that are not expected to occur.

For serial data, a known burst error encoder comprises a series of shift register stages with some of the stages coupled to the next through a modulo 2 adder that is connected to receive the output of the last register stage. (Modulo 2 addition is explained in Caldwell, Switching Circuits and Logical Design pp. 667, 668; a modulo 2 adder is also called an Exclusive OR circuit.) As the message advances into the shift register, the shift register stages are given sets of values corresponding to the successive remainders that occur in ordinary long division. When the last bit of the message has been entered into the first stage of the register, the register stages contain the remainder that is to be used as an error check. At the receiver the message bits are again divided by the generator polynomial to produce a remainder and this remainder is compared with the check bits that follow the message. If the message has been received correctly the two sets of check bits agree.

With this introduction to a specific error detector of the known prior art, it will be easy to appreciate the objects of this invention which will be discussed next.

*Objects.*—A general object of this invention is to provide a new and improved burst error detector for operating on parallel inputs.

A more specific object of the invention is to provide a new and improved burst error encoder with a simplified circuit for shifting the check bits out of the register stages and onto the data output line. Because of the feedback connections in the shift register, the contents of the register stages cannot be shifted directly onto the line. Serial input circuits of the known prior art having included gates in the feedback loop that inhibit the feedback as the check bits are shifted successively from stage to stage and onto the data output line. The inhibiting circuits are fairly simple in the series shift register that has been described already, but in the parallel input register described in detail later the feedback connections are more complex and many logic circuits are required to inhibit the feedback. With the circuit of this invention the check bits can be shifted out of the register while the feedback connections are maintained.

Another object of the invention is to simplify the circuits for comparing the check bits with the register contents generated by the decoder. In known prior art circuits the feedback circuits in the decoder have been inhibited (like the feedback circuits in the encoder) and the contents of the last stage have been shifted into a comparator circuit along with the incoming check bits. In the circuit of this invention components that are part of the simplified circuit described earlier are used for comparing the incoming check bits with the remainder generated by the decoder.

*Introduction to the invention.*—The circuit of this invention comprises an array of shift register stages that are arranged to receive a predetermined number of parallel inputs or a single input and to operate on the message bits to generate a remainder in the way that has already been described. At the end of the message, zeros are shifted into the register and the contents of the register stages are shifted out of the last stage (or the last several stages in a parallel encoder). During this shift operation the feedback connections are maintained and the check bits that are formed on the data output lines differ from the remainder that was formed by the encoder according to the feedback connections. As will be explained later, this modified remainder has the same error detecting and correcting properties as the remainder that was originally held in the register.

The decoder operates on the incoming message bits to generate a similar remainder. As the check bits enter the decoder the remainder is shifted out of the last stage (or the last several stages) and is shifted into the first stages or the first few stages. If there ha been no error the contents shifted out of the register at the decoder equal the corresponding output of the encoder. The modulo 2 adders at the input compare the feedback connection and the output connection and produce the zero values when the two agree and produce a one if there is an error. A suitable circuit is connected to respond to a one output to signify an error.

The detailed description of the invention in a parallel and serial form will explain further goals of a burst error detector and more specific problems in meeting the goals. From the more specific description other objects and advantages of the invention will be apparent.

*The drawing.*—FIG. 1 is a schematic of a burst error detector of this invention arranged to handle serial input data.

Figure 2A:
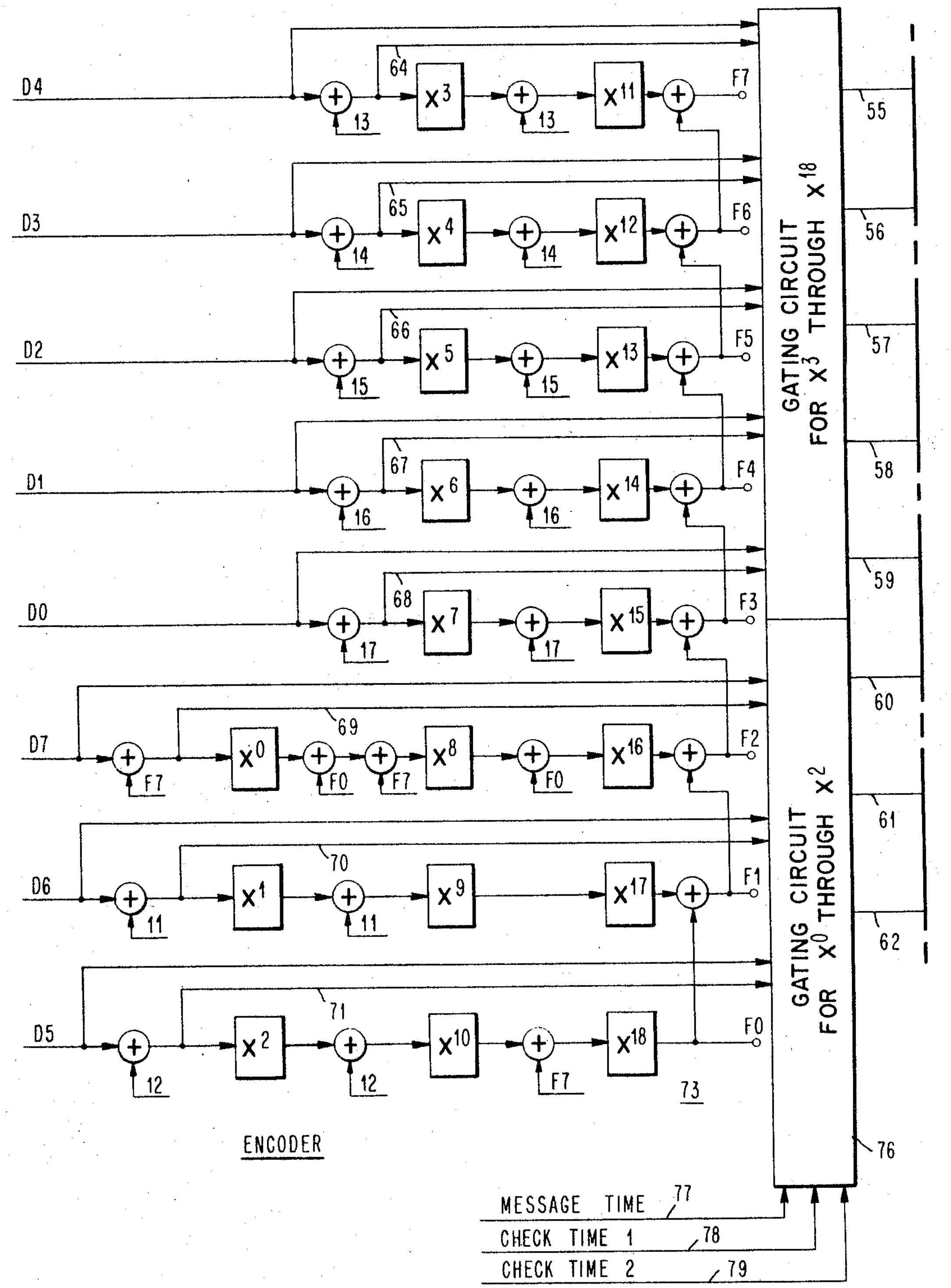
Figure 2B:
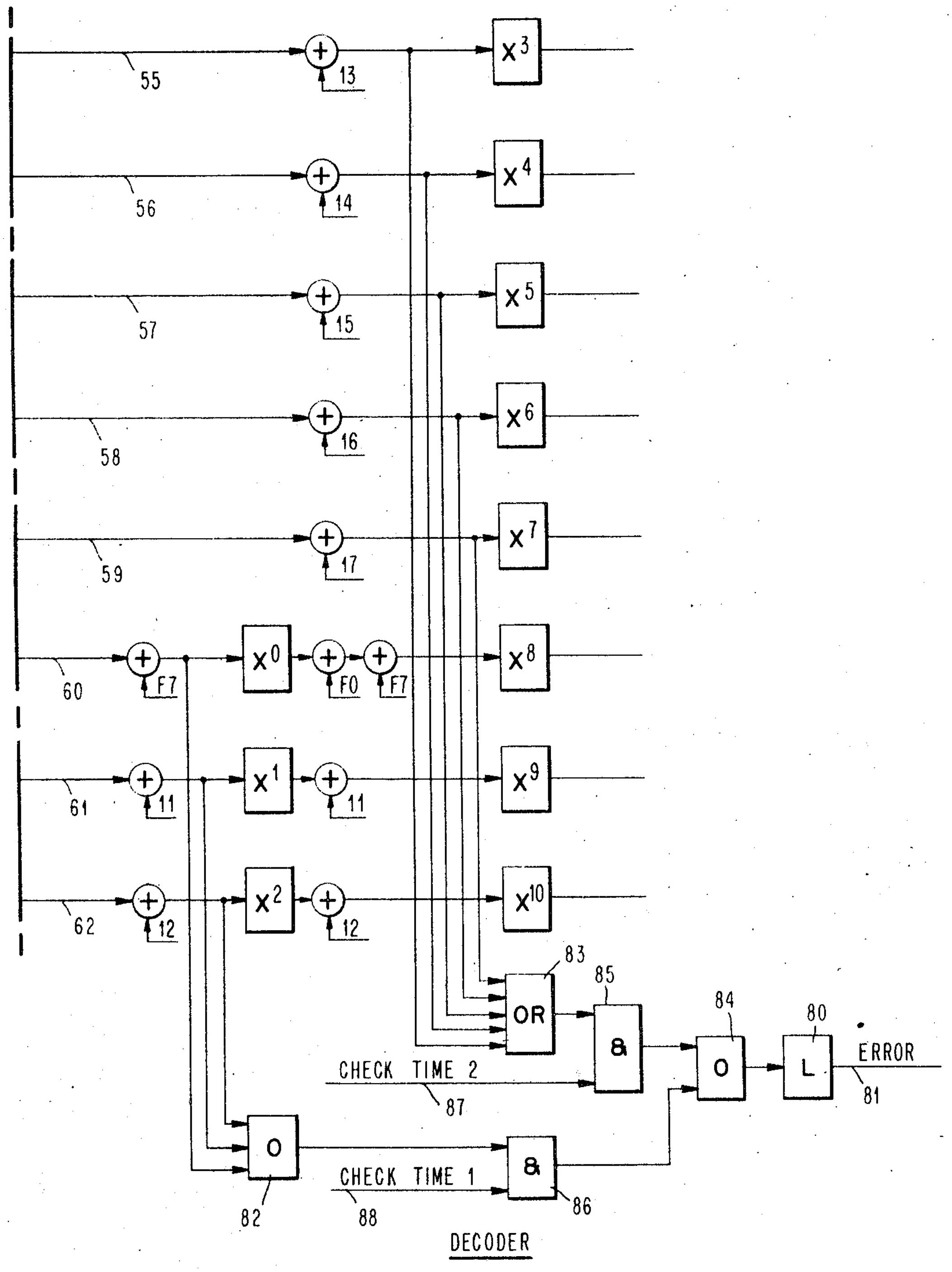

FIGS. 2A and 2B show a schematic of a burst error detector of this invention arranged to handle parallel input data.

Numbers 0 through 18 are used to show the order of register stages, the order of data entering the register, and similar quantities. Numbers above 25 are identifying characters without numerical significance.

*Introduction to the circuit of FIG. 1.*—FIG. 1 shows two stations that are linked by an output data line 25. The two stations are preferably arranged to communicate in both directions along line 25, but to simplify the explanation the station to the left of line 25 is shown with only the components that function to generate a message and the station to the right of line 25 is shown with only the components that function to receive a message and produce an error signifying ouput.

The sending station includes an encoder 26 that receives a message on an input line 27 and generates check bits on a line 28. A circuit associated with the circuit forming the message provides signals 29, 30 that define a message time when output data line 25 is to receive the message from line 27 and a check time when it is to receive the check bits from line 28. A suitable logic circuit 31 is connected to respond to signals 29, 30 to apply the message and check bits to the output data line 25 in the appripriate sequence.

The receiving station includes a decoder 34. Decoder 34 is identical to encoder 26 and only the first few stages are shown in the drawings. As will be explained in detail later, encoder 26 generates check bits in response to a message on line 27 while decoder 34 generates check bits in response to the message on line 25. If the two messages are the same, the check bits in encoder 26 and decoder 34 will be identical. As the check bits are transmitted along line 25 from encoder 26, they are compared by means of circuits that will be described later. If a difference is detected, the circuit produces an error indicating output on a line 35.

As the circuit of FIG. 1 has been described in this introduction it illustrates well known error detecting systems.

*The encoder.*—The encoder is a linear feedback shift register. The specific shift register of FIG. 1 has 19 stages, designated by the letter X with a superscript number indicating the place of the corresponding term in the general polynomial. The circuit of FIG. 1 operates on a message at line 27 according to the generator polynomial $$X^{19}+X^{18}+X^{9}+X^{8}+X+1$$

The non-zero terms are represented by register stages having a connection from a feedback line 37 from the last stage through a modulo 2 adder 40, 41, 42, 43, 44. The zero coefficient terms in the polynomial are represented by register stages that do not have a direct feedback connection. As the message polynomial on line 27 is shifted through the register, the stages are given values that correspond to the remainder in the operation of dividing the message polynomial by the generator polynomial. As has been explained in the introduction, the remainder that is held in the shift register has error detecting properties. The circuit of this invention generates a different remainder that has the same error detecting and correcting properties. The output of the last stage of the register is connected to each of the modulo 2 adders without intervening gates. At the end of the message the register is shifted 19 times while zeros are applied to input data line 27. Output line 28 is connected to receive the contents of the last register stage. For reasons that will be explained in connection with the decoder 34, line 28 is connected to the output of modulo 2 adder 40, the first adder in the register. Since zeros appear on line 27 as the register stages are shifted onto line 28, line 28 has the value of the last stage of the register. Although the check bits on output line 25 differ from the check bits held in the register at the end of the message, the check bits on line 25 have the same error detecting and correcting capabilities. M. Y. Hsiao and K. Y. Sih have developed a formal proof of this equivalence that is presented in IEEE Transactions on Electronic Computers, EC–13, No. 6, December 1964, pages 738–740. An intuitive explanation of the error detecting and correcting code of this invention will be presented in the explanation of the circuit of FIG. 2.

*The decoder.*—Only the first few stages of the register of the decoder are shown in FIG. 1. As the first check bit enters the modulo 2 adder 47 at the input of decoder 34, the corresponding term of the remainder appears on the feedback line 48. If there is no error in the received message the check bit on line 25 agrees with the check bit on feedback line 48 and the output 49 of modulo 2 adder 47 is zero. Output 49 is applied to an input 50 of an error indicating latch 51 by a gate 52 having a controlling input 53 that is similar to input 30 at the sending station and is energized when the receiver is receiving check bits. As successive check bits enter decoder 34, zeros enter the first stage of both the encoder and the decoder. Since these zeros are modified by feedback inputs during shifting, the registers of both the encoder 26 and the decoder 34 receive nonsignificant entries that advance one stage behind the highest order of the remainder. (The nonsignificant contents of the two registers differ, an effect that is significant in the parallel circuit of FIG. 2.) When the last bit of the remainder has been shifted out of each register, the registers are restored to zero by conventional circuitry that is not shown in the drawing.

The operation of the circuit of FIG. 1 will be explained in more detail in the description of the circuit of FIG. 2 since the parallel circuit of FIG. 2 is designed so that it operates like the circuit of FIG. 1.

*The circuit of FIG. 2.*—FIG. 2*a* shows an encoder for parallel inputs and FIG. 2*b* shows a decoder. The encoder and decoder are preferably identical and, as in FIG. 1, the drawing shows only components that are significant to the operation of encoding and decoding. The circuit of FIG. 2 operates on 8 parallel input lines according to the same generator polynomial as the circuit of FIG. 1.

FIG. 2*a* shows 8 input lines identified by legends $D_0 \ldots D_7$ that correspond to 8 successive data inputs to the circuit of FIG. 1 in the sequence beginning with $D_0$. A circuit of 19 register stages operates on the parallel input data, and energizes 8 data output lines 55 through 62 with message bits followed by check bits. Gating circuits 76 which are individually similar to circuit 31 of FIG. 1 connect the output lines to receive either the message bits from lines $D_0$ through $D_7$ or the check bits, which are formed on lines 64 through 71. Eight points in the circuit of the decoder are connected to a suitable logic circuit that detects errors in ways that are somewhat similar to the decoder 34 of FIG. 1.

*The parallel linear feedback shift register.*—The 19 shift register stages of FIG. 2*a* are connected to have the same contents after each shift that the correspondingly numbered stage in FIG. 1 has after 8 shifts. Thus in general each of the inputs is connected to the one of the first 8 register stages $X^0$ through $X^7$ that it would reach after 8 shifts, and each register has its output connected to the 8th next register stage. Stated more generally, there are $n+1$ register stages $X^0 \ldots X^n$ and $s+1$ parallel inputs $D_0 \ldots D_s$; a particular input $D_i$ is connected to register stage $X^{s-i}$; and except for the last $s+1$ stages, a particular register stage $X^i$ has its output connected to the input of a stage $X^{i+s+1}$. These inputs are modified according to any feedback values that the contents of each stage would receive at some time during 8 successive shifts in the circuit of FIG. 1. The feedback connections will be described in the next paragraph.

For generality, the successive values of the feedback line in FIG. 1 can be represented as a sequence $F_0 \ldots F_8$. Thus, in the simplest example the initial value on the feedback line is the contents of register stage $X^{18}$. During successive shifts, however, the contents of preceding registers arrive at stage $X^{18}$ with additions from intervening modulo 2 adders. In the circuit of FIG. 1 the last 8 stages of the register include a single modulo 2 adder 44 at the input to stage 18. Thus, in the circuit of FIG. 1

$$F_0=18,\ F_1=18+17,\ F_2=16+(17+18)$$

and so one. (Numbers 0–18 designate the outputs of the corresponding register stages.) In the circuit of FIG. 2 an array 73 of modulo 2 adders connects the outputs of registers stages 11 through 18 to form values $F_0$ to $F_7$ To look ahead in this explanation, this circuit takes advantage of a feature of modulo 2 addition that like values cancel. Some of the modulo 2 adders in the circuit of FIG. 1 are located as adjacent pairs. As the contents of a preceding register stage shifts through two adjacent adders, it receives two successive feedback values. For example, the contents originally in stage 7 receives the additions $F_0$ and $F_1$ on successive shifts through register 8 and register 9. These values simplify to be the contents of one of the register stages as can be seen by expanding the values of these feedback terms:

$$F_0+F_1=18+(18+17)=17$$

In the circuit this is a substantial simplification because it does not use some of the intermediate values $F_1$ through $F_6$ and the 7 modulo 2 adders shown in FIG. 2 may be made up of a single 8 way modulo 2 adder.

With this introduction, the specific interconnections between registers and input terminals can be explained in similar groups.

In the serial circuit inputs $D_0$ through $D_6$ each enter corresponding register stages 1 through 7 after receiving feedback inputs at the two adjacent modulo 2 adders 40, 41 at the inputs to stages $X^0$ and $X^1$. Input $D_0$ for example receives feedback value $F_0$ on the first shift and feedback value $F_1$ on the second shift. As has already been explained, this can be simplified to the value held in register stage $X^{17}$, and the drawing shows the simplified form of the appropriate feedbacks.

Data bits $D_7$ enters the register stage $X^0$ after receiving feedback value $F_7$.

The initial contents of register stage $X^0$ shift into register stage $X^8$ after passing through two nonadjacent adders 41, 42 and receiving feedback values $F_0$ and $F_7$. These values do not simplify and the addition is performed in the circuit of FIG. 2 by two modulo 2 adders or equivalently a three-way modulo 2 adder.

Register stages $X^1$ through $X^7$ shift into register stages $X^9$ through $X^{15}$ after passing through two adjacent modulo 2 adders 42, 43 at the entry of register stages $X^8$ and $X^9$. As has already been explained, these feedback values simplify and FIG. 2 shows modulo 2 adders providing an appropriate feedback from register stages $X^{11}$ through $X^{18}$.

Register stage $X^9$ shifts directly into register stage $X^{17}$ without feedback since there are no adders between stages $X^9$ and $X^{17}$ in the circuit of FIG. 1.

Register stage $X^{10}$ shifts into register stage $X^{18}$ with the addition of feedback value $F_7$ on entering stage $X^{18}$.

The circuit of FIG. 2 operates differently from the circuit of FIG. 1 in shifting the remainder out of the register stages and on to the parallel data output lines 55–62. However, it will be helpful to first consider a similarity of the two systems and a hypothetical operation of FIG. 2 that is a direct counterpart of the operation of the circuit of FIG. 1. As has already been explained, at the end of a message lines $F_0$ through $F_7$ represent the value of the feedback line in FIG. 1 for 8 successive shifts. With the first shift after the end of the message in the circuit of FIG. 2, the next 8 output values would appear at register stages $X^{11}$ through $X^{18}$; these values would be identical to the second group of 8 shifts in the circuit of FIG. 1, $F_8$ through $F_{15}$. At the next shift in the circuit of FIG. 2, register stages $X^{16}$, $X^{17}$ and $X^{18}$ would receive the values $F_{16}$, $F_{17}$, $F_{18}$ corresponding to the last three bits of the remainder and register stages $X^{11}$ through $X^{15}$ would receive extraneous values (which correspond to $F_{19}$–$F_{23}$). By connecting lines $F_0$ to $F_7$ through corresponding input lines of the decoder and by gating out the last values of register stages $X^{11}$ through $X^{15}$ (as explained later), the circuit of FIG. 2 can be made to generate a check bit pattern identical to the pattern of FIG. 1. In this hypothetical circuit the decoder would be similarly shifted and the values of the output lines compared in modulo 2 adders to detect any difference between the two sets of check bits.

The hypothetical arrangement just described provides checking information satisfactorily but it also requires 8 modulo 2 adders that function only for comparing the two sets of check bits. The circuit of FIG. 2 preserves the feature of the circuit of FIG. 1 that the modulo 2 adders at the decoder circuit inputs function as the comparator for the two sets of check bits.

In the encoder of FIG. 2*a* each input line $D_0$ through $D_7$ and an output from the associated adder are applied in sequence to the corresponding output line 55 through 62 by means of gating circuits 76 that are individually similar to circuit 31 of FIG. 1. The gating circuits are arranged to transmit the data on lines $D_0$ through $D_7$ in response to a signal on a line 77 during the message time. Two lines 78, 79 to the gating circuits define two check times. During check time 1 only the adders at the inputs to register stages $X^0$, $X^1$ and $X^2$ are connected to the corresponding output lines, and the other output lines 55–59 receive zeros. During check time 2 each output line is connected to the output of its associated adder.

In the decoder of FIG. 2*b* the check bits on lines 55 through 62 enter modulo 2 adders with feedback values generated in the decoder. So long as no detectable error occurs, a zero appears at the input of register stages $X^0$ through $X^7$ and a latch 80 is connected to be set in response to a 1 at an adder output to energize an error indicating output 81. An OR circuit 82 is connected to receive the values at the inputs of stages $X^0$, $X^1$ and $X^2$ and an OR circuit 83 is connected to receive the inputs to stages $X^3$ through $X^7$. An OR circuit 84 and two AND circuits 85, 86 are connected to apply the output of OR circuit 82 to the input of latch 80 during check time 1 and to apply the output of either OR circuit 82, 83 to the latch input during check time 2. The check times are defined by input lines 87 and 88 to AND circuit 85 and 86. Thus the circuit of FIG. 2 operates differently from the circuit of FIG. 1 and the suggested variation in the circuit of FIG. 2.

As has been suggested but not yet explained, the difference in operation of the circuits of FIGS. 1 and 2 is associated with the fact that the modulo 2 adders at the inputs to the first 8 stages of the decoder of FIG. 2*b* are connected as comparators for the two sets of check bits. This part will now be explained. As zeros are entered into the encoder of FIG. 2*a*, feedback values are entered in parallel in the first stages and the checking information is preserved; (the modified contents of the register stages are still valid checks). By contrast, as check bits enter the decoder, zeros enter in parallel the first 8 stages. These zeros are modified by feedback inputs at the entry to stages $X^8$, $X^9$ and $X^{18}$ of the serial input, but the error checking significance of these stages is substantially lost. After two shifts, some zeros entered in stages $X^3$ through $X^7$ of the decoder appear at inputs to the input stage adders as check bits. (The zeros entered into $X^0$, $X^1$, $X^2$ would not appear until the next shift.) Inhibiting the check bits of encoder stages $X^3$–$X^7$ during check time 1 enters zeros in the corresponding stages of the decoder and thereby preserves the values for comparison after the second shift.

Consider a simple example. At the end of a message, register stage $X^3$ of both the encoder and decoder contains a one or zero value that can be designated 3. The value 13 appears at the input of the adder of stage $X^3$ of the encoder and the decoder. As a zero is shifted into the encoder, value 13 enters register stage $X^3$ of the encoder. If the 13 is transmitted to the decoder, a zero (13+13) will enter decoder stage $X^3$. This zero also signifies that the check of register stages $X^{13}$ is satisfactory. On the second shift the 13 value in stage $X^3$ of the encoder enters stage $X^{11}$ (with the value 5+15 which appears at the input to stage $X^{11}$) and this value in stage $X^{11}$ appears at the input of stage $X^1$ to be transmitted with the third group of check bis. In the circuit of the drawing this same value 13+5+15 also appears at the input of decoder stage $X^1$ because the value 13 was entered into register stage $X^3$ on the first shift.

The unused 13 at the input of decoder stage $X^3$ at the end of a message is a valid check bit and the gates can be arranged to transmit in parallel 19 consecutive check bits followed by 5 zeros.

From the two error detectors described in detail and the suggestions for variations, those skilled in the art will recognize various modifications within the spirit of the invention and the scope of the claims.

What is claimed is:

1. A coding circuit for operating on a plurality $s+1$ of parallel inputs $D_0 \ldots D_s$ according to a generator polynomial to produce check bits comprising, a plurality $n+1$ of shift register stages $X^0 \ldots X^n$, each corresponding to one of the terms in the generator polynomial, means connecting each of said inputs of the coding circuit to the input of an individual one of the first $s+1$ register stages $X^0 \ldots X^s$ according to the relationship $D_0$ to $X^s$, $D_1$ to $X^{s-1}$, ... $D_s$ to $X^0$, and connecting the output of each register stage $X^i$, except the last $s+1$ stages, $X^{n-s} \ldots X^n$, to the input of the next $s+1$th stage, $X^{i+s+1}$, said means including modulo 2 adders located between said coding circuit inputs and stages and between connected stages according to nonzero coefficients between corresponding terms in the generator polynomial, and feedback means connected to the outputs of said last $s+1$ stages to form feedback values according to nonzero coefficients in the corresponding terms of the generator polynomial and connecting said adders to receive said values.

2. A coding circuit according to claim 1 in which said feedback means provides feedback values that are functions of modulo 2 additions of the outputs of said last $s+1$ stages according to nonzero coefficients in the corresponding terms of the generator polynomial, and said feedback values are applied to said modulo 2 adders according to the location of nonzero coefficients in the generator polynomial in relation to the term corresponding to the register stage receiving the value.

3. A coding circuit according to claim 2 in which said generator polynomial has adjacent nonzero coefficient terms, $X^i$ and $X^{i+1}$, and some of the outputs of said last $s+1$ register stages are connected to said adders to provide said functions of modulo 2 addition.

4. A coding circuit according to claim 2 in which said register stages and detector inputs are interconnected according to a generator polynomial having a single nonzero coefficient term, $X^n$, in the last $s+1$ terms.

5. A coding circuit according to claim 2 in which said register stage and detector inputs are interconnected accoding to a generator polynomial having a single nonzero coefficient term, $X^n$, in the last $s+1$ terms and having only two nonzero coefficients in the first $s+1$ terms, $X^0$ and $X^1$; stage $X^0$ being connected to receive as a feedback value the modulo 2 sum of said last $s+1$ stages; stages $X^1 \ldots X^s$ being connected to receive as feedback values the outputs of individual ones of the last $s$ stages, $X^{n-s+1} \ldots X^n$.

6. A coding circuit according to claim 5 in which said stages are interconnected according to a generator polynomial having nonzero coefficient terms between terms $X^s$ and $X^{n-s}$ that appear only as adjacent pairs whereby the set of feedback values appropriate for said first $s+1$ stages is appropriate for the entire register.

7. A coding circuit according to claim 6 in which said nonzero terms are $X^{s+1}$ and $X^{s+2}$ and each register stage $X^i$ of register stages $X^1 \ldots X^s$ has adders at its input and output receiving an identical feedback value, the output of register stage $X^{n+i-s-1}$.

8. A coding circuit according to claim 1 including a modulo 2 adder connected between each of said inputs of the coding circuit and said first $s+1$ stages, and said coding circuit includes means operable after a message has entered the coding circuit for shifting zeros into said first $s+1$ stages while maintaining said feedback connections whereby check bits appear at the outputs of said adders at the inputs of said first $s+1$ stages.

9. A coding circuit according to claim 8 in which said coding circuit functions as an encoder to produce check bits and includes, for operation as a decoder, means for entering at said inputs check bits from a similar coding circuit functioning as an encoder, whereby said modulo 2 adders at said first $s+1$ stages compare said input check bits with check bits appearing at feedback inputs to said adders, and means responsive to a 1 value at the output of any of said comparing adders to signal an error.

10. A coding circuit according to claim 9 in which the number of register stages is not an integral multiple of the number of inputs to the coding circuit and the coding circuit includes means for adding zeros to the set of check bits transmitted to make the number of bits transmitted equal an integral multiple of the number of inputs.

11. A coding circuit according to claim 10 in which said means for adding zeros to the check bits comprises means for inhibiting the transmission of feedback values at the input to stage $X^n$ and sufficient preceding stages to make the number of bits transmitted equal an integral multiple of the number of inputs.

12. A coding circuit comprising, a register having a plurality of interconnected stages, $X^o \ldots X^n$, and feedback connections from the last stage $X^n$ to some of said stages through modulo 2 adders arranged according to a generator polynomial, means for supplying message bits to an input of the coding circuit whereby at the end of a message said register contains a set of bits having error checking information, and means for shifting said checking information through said stages to a point of utilization while maintaining said feedback connections to produce a different set of bits containing the same error checking information.

13. A coding circuit according to claim 12 having parallel inputs.

14. A coding circuit according to claim 12 including a modulo 2 adder at the input of register stage $X^o$, means for shifting zeros into said stage and check bits out of said adder for operating said register as an encoder and means for shifting received check bits into said adder and producing error signifying bits at said adder output to operate said register as a decoder.

References Cited

Hsiao, M. Y., Sih, K. Y.: "Serial-to-Parallel Transformation of Linear-Feedback Shift-Register Circuits," IEEE Transactions on Electronic Computers, December 1964 (EC–13), pp. 738–740.

Peterson, W. W.: "Cyclic Codes for Error Detection," Proceedings of the IRE, January 1961, pp. 228–235.

MALCOLM A. MORRISON, Primary Examiner

C. E. ATKINSON, Assistant Examiner

U.S. Cl. X.R.

235—153